Aug. 4, 1931. R. J. PATTERSON 1,816,866
ELECTRIC RANGE
Filed July 10, 1929
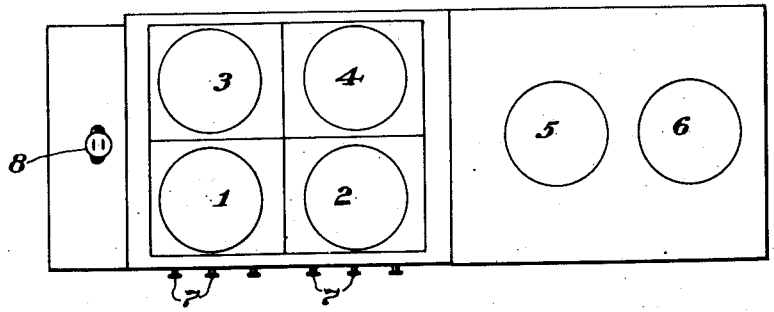
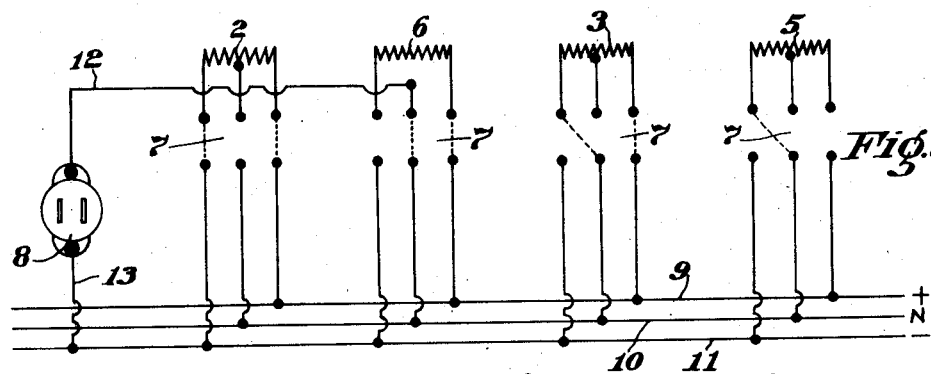
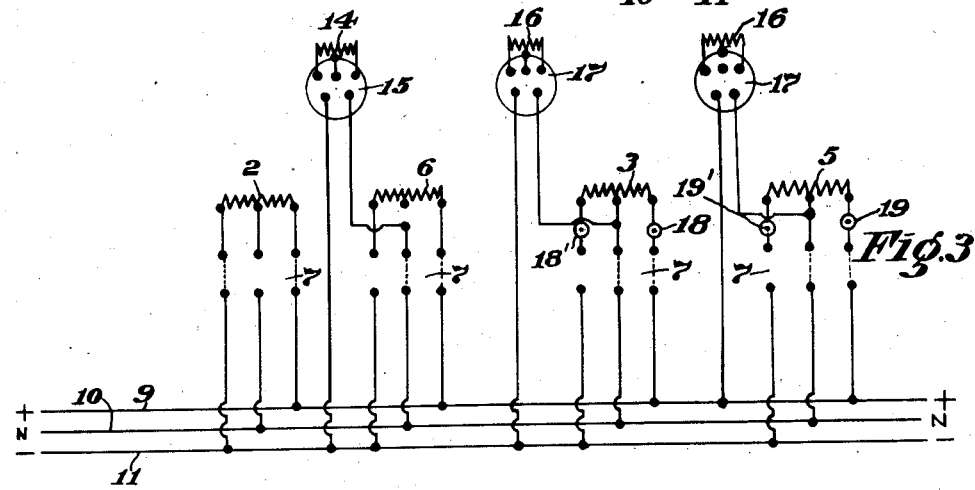
INVENTOR
Ralph J. Patterson,
BY
his ATTORNEY.

Patented Aug. 4, 1931

1,816,866

UNITED STATES PATENT OFFICE

RALPH J. PATTERSON, OF BOSTON, MASSACHUSETTS, ASSIGNOR TO WALKER & PRATT MFG. CO., OF BOSTON, MASSACHUSETTS, A CORPORATION OF MASSACHUSETTS

ELECTRIC RANGE

Application filed July 10, 1929. Serial No. 377,259.

This invention relates to electric ranges.

In installing a range of this type the size of the transformer and the wiring used depend on the total possible load which the range is capable of carrying. In other words, it must be assumed that all of the units will be used simultaneously to their full capacity, and the wiring and transformer must be capable of carrying this load without undue heating. The installation expense, therefore, depends to some extent on the total rated load of the range.

It has been proposed to equip electric ranges with a receptacle or outlet to facilitate the use of other pieces of electrical equipment, such as mangles, electric water heaters, flat irons, or the like, and one objection to the use of such receptacles or outlets is the fact that they add to the total connected load of the range. An electric range has a rather low load factor or low ratio between the average consumption of current and the total possible consumption of all its units, and the presence of the receptacle tends to make the load factor still less favorable.

The present invention deals with these objections, and it aims to devise a thoroughly satisfactory solution for them.

The nature of the invention will be readily understood from the following description when read in connection with the accompanying drawings, and the novel features will be particularly pointed out in the appended claims.

In the drawings,

Figure 1 is a diagrammatic view of an electric range and the various units associated therewith;

Fig. 2 is a wiring diagram of certain units of the range and illustrates features of this invention; and Fig. 3 is a view similar to Fig. 2 illustrating another embodiment of the invention.

Preliminary to a detailed description of the arrangements illustrated in Figs. 2 and 3, it may be pointed out that a typical electric range includes six heating units indicated diagrammatically in Fig. 1 at 1, 2, 3, 4, 5 and 6, respectively. The units 1 and 2 at the front of the top of the stove frequently are made of a larger capacity so that they will give a higher heat than the rear top units 3 and 4, the first two having a consumption of, say, 2,000 watts each, while the two latter units may have a rating of, say, 1,000 watts each. One of the units 5 is used to heat the oven for baking, while the other unit 6 is ordinarily used for broiling and will be herein referred to as the top-oven or broiler unit. In a typical range these units each are designed to take about 1,500 watts. The six switches for controlling the flow of current to the individual units 1 to 6, inclusive, are indicated in Fig. 1 at 7, and the outlet or receptacle to which an electrical attachment, such as a mangle, water heater, or the like, may be connected is shown at 8. The electric heating units 1 to 6, inclusive, ordinarily consist of resistance coils, each coil comprising two sections, and they are connected with a source of current supply in such a manner that one or both sections can be used, as desired.

Referring to the wiring diagram shown in Fig. 2 and in which certain of the coils illustrated in Fig. 1 are shown, as for example coils 2, 3, 5 and 6, it will be observed that each coil is arranged to be connected through its switch 7 with a three wire supply circuit, the individual busses of this circuit being indicated, respectively, at 9, 10 and 11. The buss 10 is neutral, while the buss 9 has a positive potential of 110 volts above the neutral conductor, and the buss 11 has a negative potential of 110 volts below the neutral wire 10, so that there is a potential difference of 220 volts between the busses or conductors 9 and 11. This is a typical three wire arrangement well known in this art. The switches 7 preferably are of the so-called "load balancing type," one example of such a switch being shown in the Blakesley Patent No. 1,626,221. Each of these switches is movable into four different positions, "high," "low," "medium" and "off," the circuit connections made in the four positions being illustrated by the dotted lines in Fig. 2. For example, the switch for the coil 2 is shown in such a position as to apply 220 volts to this coil, while the position illustrated for the switch 7 of the coil 3 impresses only 110 volts on its coil. These are, respectively, the high and low positions. The switch for the coil 6 is shown in its intermediate or medium position, since if this coil were connected like the others, only one-half of the coil would be in circuit with the supply busses. The switch for the coil 5 is shown in its off position where no current flows through the coil. The arrangement so far described has been known and is not of this invention.

It is not always necessary to provide for the three heats above mentioned on all of the heating units. For example, the top oven unit 6 never need be used on a medium position, the high and low heats being sufficient. The present invention takes advantage of this fact to connect another electrical unit with the supply circuit through the switch for the heating unit 6.

Referring to Fig. 2 it will be seen that the neutral point of the coil 6 has been disconnected from the switch 7 for this coil, and that instead a conductor 12 leads from the neutral point at the delivery side of the switch to the receptacle 8, while another conductor 13 connects this receptacle with one of the 110 volt wires. Consequently, by turning the switch for the unit 6 into its medium position, the receptacle 8 will be connected across the supply circuit wires 10 and 11. Any attachment designed for a 110 volt current can therefore be operated by plugging into this receptacle or outlet 8. At the same time the circuit connections are such that the receptacle is cut out of circuit whenever the switch is in any of its other positions. In other words, this arrangement permits the use of the broiler or top oven unit 6 exactly as it is used in any range except that its medium heat is not available. But an additional piece of equipment can be operated from the controlling switch for the coil 6 simply by turning this switch into its medium position.

This circuit arrangement is such that the coil 6 and the receptacle 8, or the apparatus supplied therefrom, cannot be used simultaneously. Consequently, if the rating assigned to the receptacle 8 is not greater than that of the coil 6, then no increase has been made in the maximum connected load of the range. At the same time the usefulness of the range has been materially increased.

It is contemplated that the nature of the auxiliary equipment supplied with current in the manner just described may be such that an additional switch is desirable to control the flow of current through it, either manually or automatically, as for example, where a thermostatically operated switch is required. Such an arrangement is illustrated in Fig. 3 where a heating unit 14 is connected with the switch for the coil 6 in the manner shown in Fig. 2 except that an additional switch 15 is included in the connection between the unit 14 and the switch 7. Assuming that the unit 14 is a heating coil with a neutral point, a switch 15 of the series-parallel type would ordinarily be used so as to permit the connection of the coil 14 with the supply circuit in such a manner as to produce either a high, low, or intermediate heat. The coil 14 may be used to replace one of the smaller capacity coils of the range, such for example as the units 3 or 4, in which case the total connected load for the range would be reduced without reducing the number of units or the manner in which they are used, except only to eliminate the medium heat on the broiler unit 6.

If for any reason it should be desired to retain the medium heat adjustment on the main unit, this could be done by connecting the neutral point on the discharge side of the switch with the neutral point of the coil and leaving the other connections with the unit 14 exactly as they are shown. Such an arrangement is shown connected with the unit 3 where the coil 16 and switch 17 correspond, respectively, to the unit 14 and switch 15. This arrangement, however, has the disadvantage that one-half of the coil 3 must be in circuit whenever the unit 16 is being used. On the other hand, the coil 3 can be used just as though the elements 16 and 17 were not connected with it. A fuse 18 in the extreme right-hand leg of the circuit protects the coils from overload.

Instead of connecting the coil 16, as shown in its association with the coil 3, it may be connected to the neutral point of one of the coils, as shown at the right-hand side of Fig. 3 in connection with the coil 5, where it is connected in parallel with the right-hand side of the coil 5 instead of in series with this part of the coil, as in the arrangement shown in the central part of this figure. Fuses 19—19' protect the coils from overloading, but in this arrangement if the fuse 19' blows as it would if both switches 7 and 17 were used in their high positions simultaneously, the coil 16 and the right-hand half of the coil 5 could still be used without the fuse 19 blowing.

The invention thus provides an arrangement in which the total connected load of the range may be decreased without reducing the number or size of the units. Or the number of units which can be supplied with current can be increased without increasing the total connected load. The load factor is improved and the load balance is not disturbed.

While typical embodiments of the invention have been disclosed, it will be understood that the invention may be embodied in other forms without departing from the spirit or scope thereof. For example, connections such as those described may obviously be made to other units than the particular units mentioned.

Having thus described my invention, what I desire to claim as new is:

1. In an electric range, the combination of an electric heating unit, a three wire supply circuit, a load balancing switch, connections whereby said switch is operable to control the flow of current from said supply circuit through said unit to produce either a high or low heat, as desired, a second electrical unit, and connections for enabling said switch to control the flow of current through said second unit, said connections including conductors leading from the neutral wire of said circuit through the switch to said second unit.

2. In an electric range, the combination of an electric heating unit, a three wire supply circuit, a load balancing switch, connections whereby said switch is operable to control the flow of current from said supply circuit through said unit to produce either a high or low heat, as desired, said switch having high, low and medium positions, a second electrical unit, and connections whereby said switch is operable to connect said second unit into said supply circuit when the switch is in its medium position but serving to disconnect said second unit from said circuit when the switch is in the other of said positions.

3. In an electric range, the combination of an electric heating unit, a three wire supply circuit, a load balancing switch, connections whereby said switch is operable to control the flow of current from said supply circuit through said unit to produce either a high or low heat, as desired, a second electric heating unit having a neutral point, connections for enabling said switch to control the flow of current through said second unit, and a second switch between the first switch and said second unit operable to control the flow of current through the latter unit to produce either a high or low heat as desired.

4. In an electric range, the combination of an electric heating unit, a three wire supply circuit, a load balancing switch, connections between said circuit, switch and unit whereby the switch is operable to connect said unit with said circuit to produce either a high or low heat, as desired, a second electrical unit, and conductors for connecting said second unit to said circuit through said switch to enable the switch to control the flow of current through said second unit, the connection between said circuit and units being so arranged as to prevent them being used simultaneously.

5. In an electric range, the combination of an electric heating unit, a three wire supply circuit, a load balancing switch, connections between said circuit, switch and unit whereby the switch is operable to connect said unit with said circuit to produce either a high or low heat, as desired, a second electrical unit, connections between said second unit and said switch and first unit for enabling the switch to control the flow of current through the second unit, and an additional switch connected in circuit with said second unit for controlling the flow of current through it.

RALPH J. PATTERSON.